United States Patent [19]

Robine, Jr. et al.

[11] Patent Number: 4,721,941

[45] Date of Patent: Jan. 26, 1988

[54] OIL GAUGE ACCESSORY FOR AUTOMOTIVE VEHICLES

[76] Inventors: Paul Robine, Jr., 22641 Beech St., Dearborn, Mich. 48124; Benson L. Hoffman, 13726 Minock St., Detroit, Mich. 48223

[21] Appl. No.: 864,310

[22] Filed: May 19, 1986

[51] Int. Cl.$^4$ ................................................ B60Q 1/00
[52] U.S. Cl. ...................... 340/59; 340/612; 340/618; 340/623; 73/307
[58] Field of Search ............ 340/59, 60, 612, 618, 340/623, 625; 73/290 R, 305, 306, 307, 317

[56] References Cited

U.S. PATENT DOCUMENTS

| | | | |
|---|---|---|---|
| 2,714,715 | 8/1955 | Manier | 340/59 |
| 3,605,086 | 9/1971 | Triska | 340/59 |
| 3,849,770 | 11/1974 | Hayashida | 340/59 |
| 3,872,429 | 3/1975 | Arney | 340/59 |
| 3,949,360 | 4/1976 | Pignata et al. | 340/59 |
| 3,953,845 | 4/1976 | Kress | 340/59 |

*Primary Examiner*—Donnie L. Crosland
*Attorney, Agent, or Firm*—Harness, Dickey & Pierce

[57] ABSTRACT

An oil gauge accessory for automotive vehicles and the like having a float switch disposed in a casing adapted to be mounted for vertical adjustment alongside the crankcase oil pan and to be connected by suitable tubing at the bottom thereof to the drain opening of the oil pan so that crankcase oil and the float switch rises in the casing to the same level as in the oil pan. Signal means such as different colored lights and a normally open manually operable switch in-circuit with the float switch and a suitable power source, are mounted so as to be visible to and operable by the driver of the vehicle. The casing is adjustable so that when the manual switch is closed, the float switch energizes either one of the signal means which indicates a proper level of oil in the crankcase or the other signal means which indicates that the oil level in the crankcase is low and needs to be replenished.

1 Claim, 3 Drawing Figures

OIL GAUGE ACCESSORY FOR AUTOMOTIVE VEHICLES

BACKGROUND OF THE INVENTION

There is a need in the art for a device that can be applied as an accessory to a conventional automotive vehicle or the like and that will apprise the operator without the necessity of raising the hood and checking the oil level with the dip stick in the conventional manner whether the lubricant in the crankcase oil pan is at a proper level or whether it needs to be replenished. Checking the oil level by the dip stick is not difficult, but it cannot be done conveniently at certain times or in inclement weather and very often not at all without soiling the clothing of the person doing the job. There is a tendency, therefore, to let the matter go; and this can be detrimental in the extreme if the oil level is down below the level where oil should be added. Also, the job may be distasteful to many persons and even impossible to perform if the person if physically disabled. Furthermore, it is increasingly difficult and sometimes not possible to have the job done by someone else as for example a filling station attendant as once was the case.

SUMMARY OF THE INVENTION

The present invention is a mechanically relatively simple oil gauge accessory devide that can be manufactured and installed relatively inexpensively. The gauge itself is installed alongside and connected to the crankcase oil pan and in turn is connected to signal means and a manual switch that can be readily mounted on the instrument panel or other convenient part of the vehicle which is readily accessible and visible to the operator. After installation, the oil level can be easily and quickly checked simply by operating the manual switch. In a preferred embodiment of the invention, the switch is closed to energize one or the other of two lights that let the operator know whether the oil at is a proper level or is down sufficiently so that the oil should be added.

In addition to the foregoing, because of its construction and particular mode of use, the oil gauge accessory device of this invention can be easily connected by any mechanic or person skilled in the art in the start circuit of the vehicle so that the ignition circuit is automatically disabled if the oil level drops to a point where oil needs to be added. This is a particularly desirable feature in the case of fleet operations of vehicles such as trucks, taxicabs, and the like, where drivers of individual vehicles may be careless or indifferent to proper maintenance of the vehicles.

DESCRIPTION OF THE DRAWINGS

In the drawings, wherein for the purpose of illustration is shown a preferred embodiment of the invention.

DESCRIPTION OF THE PREFERRED EMBODIMENT

Figure 1:
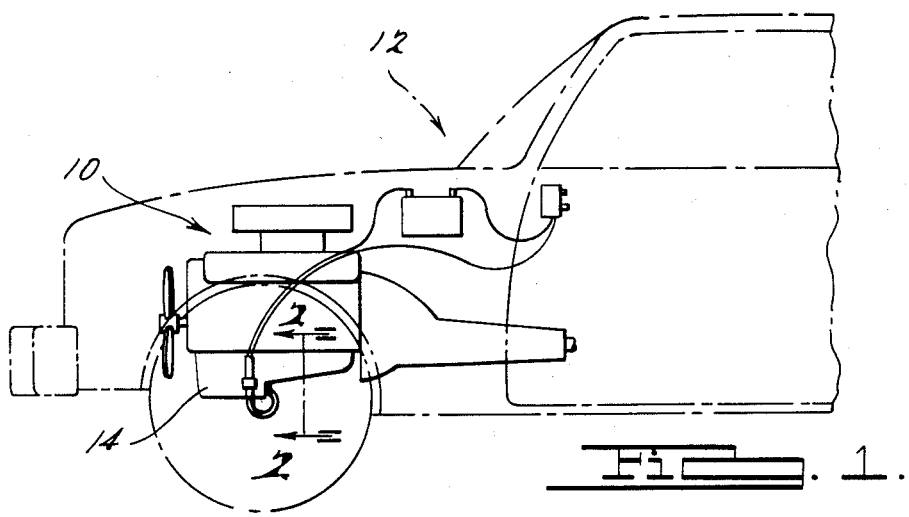
FIG. 1 is a side elevational view showing the engine of an automotive vehicle and the oil gauge accessory device of this invention attached to the crankcase oil pan in full lines and adjacent parts of the vehicle body in dot-dash lines.

Reference is first had to FIG. 1 wherein the numeral 10 designates the engine of an automotive vehicle 12. The engine 10 is conventional in construction and operation; and it includes the usual crankcase oil pan 14 in which the oil the lubricates the engine 10 is contained. In this connection, it will be understood that the engine 10 also is eqipped with the usual external oil filler pipe (not shown) through which oil is introduced if required into the pan 14 to keep the oil at a proper level and that it is equipped also with the usual dip stick (not shown) for manually checking the level of oil in the pan 14.

Figure 2:
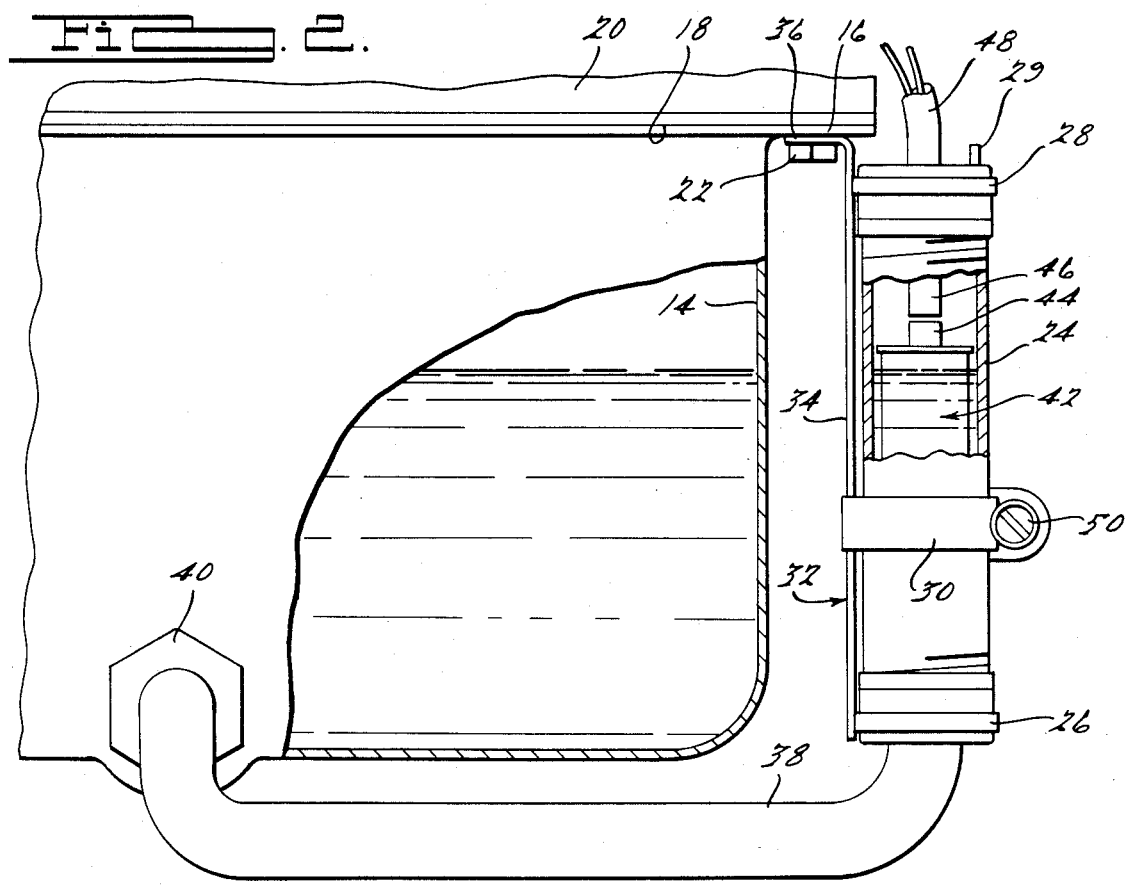
FIG. 2 is an enlarged transverse sectional view taken on the line 2—2 of FIG. 1.

As perhaps best shown in FIG. 2, the oil pan 14 is conventionally provided at the upper edge thereof with an outwardly extending flange 16 that conforms to and seats upwardly against the bottom mounting surface 18 of the engine crankcase 20. A sealing gasket (not shown) is conventionally interposed between the flange 16 and the mounting surface of the crankcase 20; and the pan 14 is fastened securely to the crankcase by a series of screws 22 that extend upwardly through clearance holes provided in the flange and into aligned tapped holes in the crankcase.

The oil gauge accessory of this invention comprises an elongate tubular casing 24 having a bottom closure 26 and a top closure 28 that is provided with an air vent 29. In practice, the casing 24 is disposed in a vertical position alongside the crankcase oil pan 14 and is attached by any suitable means such as the C-clamp 30 to a mounting bracket 32. The mounting bracket here shown comprises a vertically elongate metal strip 34 having a right angularly extending flange 36 at one end thereof. The flange 36 has a clearance hole (not shown) of a diameter to accept one of the oil pan fastening screws 22. Since there are a number of these screws 22 spaced around the flange 16, the mounting bracket 32 can be mounted at any convenient location around the oil pan 14 simply by removing a selected one of the screws 22, inserting it upwardly through the hole in the bracket flange 36, and threading the screw back into the hole in the crankcase 20 from which it was removed with the bracket strip 34 hanging downwardly, as shown in FIG. 2 of the drawing, and with the casing 24 in a vertical position at the side of the strip 34 remote from the oil pan 14.

It will be observed that the bottom closure 26 of the casing 24 carries a length of tubing 38 that opens with the casing and that is of sufficient length to extend from the mounted position of the casing to the drain opening (not shown) with which the oil pan 14 is conventionally provided. The end of the tubing 38 remote from the casing 24 carries a coupling 40 that is adapted to screw into the drain opening of the oil pan 14 after the plug that normally closes the opening has been removed. When the tubing 38 has been connected to the oil pan 14 in the manner described, oil from the pan flows into the casing 24 through the tubing displacing air from the casing above the oil through the vent 29 in the top closure 28 and rises in the casing to substantially the same level as the oil in the pan.

A float switch 42 is provided in the casing 24; and it is of a conventional type that will float on the oil in the casing and move vertically in the casing as the oil level rises and falls. Any of a number of switches of this type that are already available in the market place can be used. Switches of this type that are suitable for the purpose of this invention are provided at the upper end thereof wit an electrical contact 44 that moves with the float to or from a fixed contact 46 carried by and depending from the top closure 28. Accordingly, the movable contact 44 is positioned in the casing 24 and with respect to the fixed contact 46 in accordance with the level of oil in the casing. When the oil in the pan 14 is at a proper level, the float switch 42 is at a level in the casing 24 to position the movable contact 44 in engagement with or in close proximity to the fixed contact 46. When the two contacts 44 and 46 are engaged, or if the switch 42 is a proximity switch, when the contacts are closely adjacent to each other, the switch 42 is closed and electrically interconnects a pair of electrical conductors 52 and 54 (FIG. 3) in a cable 48 that is attached to the top closure 28. The cable 48 is part of the electrical circuit disclosed in FIG. 3. While any conventional float switch that is suitable for our applicant's purpose can be used, as indicated above, the preferred switch is a conventional proximity switch in which the movable contact 44 is in the form of a magnet that completes a circuit between the conductors 52 and 54 when it is in close proximity to the fixed contact 46, since this type of switch is exceedingly accurate. As a consequence the switc 42 closes immediately when the oil in the crankcase 20 reaches a proper level and it opens precisely when the oil level in the pan 14 reaches a level at which oil should be added. Manifestly, the point at which the moveable contact 44 breaks away from or electrically disengages the fixed contact 46 can be determined precisely by adjusting the vertical position of the casing 24 on and relative to the oil pan 14. This operation can be performed easily and quickly by loosening the screw 50 of the C-clamp 30. When the casing 24 has been properly adjusted in the manner described, it can be held securely in the adjusted position by again tightening the C-clamp screw 50. In order to permit ready insertion of the float switch 42 initially into the casing 24 or removal thereof from the casing for service or replacement, the top closure 28 is threadedly connected to the casing or otherwise removably attached to it.

Figure 3:
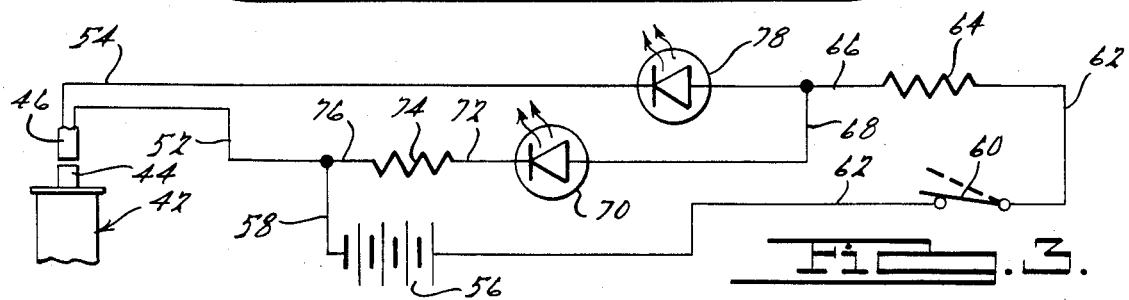
FIG. 3 is a schematic view of the electrical circuit forming a part of the oil gauge accessory device.

Reference is not had to FIG. 3 which shows the float switch 42 in the open position that is the condition of the switch when the oil in the pan 14 is low and needs to be replenished.

As suggested, the cable conductor 52 is connected to a power source 56 by a conductor 58; and the power source, in turn, is connected to a manually actuatable switch 60 by a conductor 62. From the manual switch 60, the circuit extends back to the power source 56 through a conductor 62, a resistor 64, conductors 66 and 68, a light emitting diode 70, a conductor 72, a resistor 74, and conductors 76 and 58, as shown in FIG. 3. As also shown in FIG. 3, the conductor 66 is additionally connected to a second light-emitting diode 78; and the latter in turn is connected to the conductor 54 previously referred to.

It is contemplated that the manual switch 60 and the light emitting diodes 70 and 78, or other suitable signal equivalent, be mounted in the passenger compartment of the vehicle at any suitable location such as on the instrument panel, for example, where they are readily accessible to and visible by the operator of the vehicle. Also, it is contemplated that the diodes 70 and 78 be of different colors. For example, the diode 70 may be a red light and the diode 78 may be a green light. Thus, when the manual switch 60 is open, neither of the diodes 70 and 78 is energized regardless of whether the float switch 42 is open or closed. When the float switch 42 is closed indicating an adequate level of oil in the pan 14, closure of the manual switch 60 completes a circuit through the green diode 78 apprising the operator that the oil in the crankcase does not require replenishment. The green light only is energized since the single resistor 64 in the green diode circuit permits sufficient current to flow through that circuit. However, under these circumstances, the joint effect of the two resistors 64 and 74 in the red diode circuit disables the red diode. On the other hand, if the manual switch is closed when the float switch 42 is open indicating that oil in the pan 14 is at a low level requiring replenishment, the green diode is disabled by the open float switch and current flows through the red diode circuit apprising the operator of the need to replenish the oil.

In practice the casing 24 complete with the float switch 42 can be easily and quickly installed and the tubing 48 readily connected in the drain opening of the oil pan 14. Similarly, the manual switch 60 and the two diode signal means 70 and 78 can be equally easily and quickly mounted in the passenger compartment of the vehicle. The battery 56 that powers the electrical circuits may be a separate battery that is part of the accessory package or it may be the vehicle battery. In the latter event it is, of course, necessary that the circuit portion of the accessory be connected to a part of the conventional vehicle circuitry that operates at a voltage suitable for the circuit shown in FIG. 3.

As a special feature of the invention, it is contemplated also that the float switch 42 be electrically connected in series with the start circuit of the vehicle in a manner that will be readily apparent to or that is readily ascertainable by any person skilled in the particular art involved here. This arrangement automatically disables the vehicle whenever the oil level in the pan 14 is low to the point where additional oil needs to be added. By the same token, the arrangement described makes it possible for the vehicle to be operated only when there is an adequate level of lubricating oil in the pan 14. Such an arrangement is particularly suitable for fleet operations involving trucks or taxi cabs, for example, where individual drivers may be careless or uncaring about the amount of oil in the pan 14.

Manifestly, the oil gauge accessory of this invention is adaptable as well for use on equipment other than automotive vehicles. For example it is readily adaptable for use on large industrial or stationary or movable equipment such as cranes and road scrapers. In these uses, the oil gauge simply apprises the machine operator of the fact that there is adequate or is insufficient lubricating oil for the engine that powers the equipment; and in these situation the circuit can be readily adapted to incorporate the ignition or start switch of the machine so that the latter is disabled in the event oil had been drained from the oil pan or is at a low level requiring replenishment.

We claim:

1. An oil gauge accessory for automotive vehicles and the like of the type having an engine provided with a crankcase oil pan in which lubricant oil normally is maintained at a predetermined level and from which lubricant oil is circulated through the engine comprising a casing adapted to be mounted adjacent to said oil pan with upper and lower portions thereof extending respectively above and below said predetermined level of oil in said pan;

conduit means carried by and communicating interiorly with the lower portion of said casing and adapted to be attached to and to communicate with said oil pan below the level of oil therein whereby oil from said oil pan flows into said casing substantially to the level of oil in said pan;

a float actuated switch in said casing, said switch including a float member buoyantly supported on the oil in said casing and adapted to be closed when the oil level in said casing is at or above said predetermined level and to be open when the oil in said casing is at a low level below said predetermined level, at which oil should be added to said crankcase;

a normally open, manually operable switch;

an electrical power source;

a first signal member for indicating when the oil level in said casing and said oil pan is above said low level;

first circuit means including said power source, said manually operable switch, said float actuated switch, and said first signal member, adapted to be disabled by opening of said float actuated switch;

a second signal member for indicating when the oil level in said oil pan and in said casing is at or below said low level;

second circuit means including said power source, said manually operated switch, and said second signal member;

said first signal member being connected in series with said power source and said manually actuatable switch member through said float actuated switch, and said second signal member being connected in series with said power source and said manually actuatable switch member independently of said float actuated switch; relatively low resistance means in said first circuit means; and relatively high resistance means in said second circuit means, said relatively high resistance means being sufficiently greater than said relatively low resistance means to disable said second signal means when said float actuated switch is closed but adapted to permit current from said power source to energize said second signal means when said first circuit means is disabled by opening of said float actuated switch.

* * * * *